United States Patent [19]

Toure

[11] 3,874,168
[45] Apr. 1, 1975

[54] MEANS FOR THE IN-FLIGHT COOLING OF THE FUEL CARRIED BY AN AIRCRAFT

[75] Inventor: Kléber Toure, Paris, France

[73] Assignee: Societe Nationale d'Etude et de Construction de Moteurs d'Aviation, Paris, France

[22] Filed: Jan. 29, 1974

[21] Appl. No.: 437,645

[30] Foreign Application Priority Data
Feb. 5, 1973 France .................. 73.03962

[52] U.S. Cl. ............... 60/39.28 R, 165/39, 244/57
[51] Int. Cl. .................................. F02c 9/10
[58] Field of Search ............. 244/57, 117 A, 135 R; 137/334, 335, 336, 338, 339, 340; 417/408, 417/409, 355; 165/39; 60/39.15, 39.18 R, 60/39.28 R, 39.66, 243

[56] References Cited
UNITED STATES PATENTS

| | | | |
|---|---|---|---|
| 2,483,045 | 9/1949 | Harby | 60/39.18 R X |
| 2,731,239 | 1/1956 | Andersen | 244/57 UX |
| 3,390,528 | 7/1968 | Howell et al. | 60/39.28 R X |
| 3,779,007 | 12/1973 | Lavash | 60/39.28 R |

Primary Examiner—Trygve M. Blix
Assistant Examiner—Paul E. Sauberer
Attorney, Agent, or Firm—Watson, Cole, Grindle & Watson

[57] ABSTRACT

Structure for the in-flight cooling of the fuel carried by an aircraft which has a fuel feed pump for supplying fuel to the engine and a return line through which at least part of the fuel is recycled to the suction side of the pump. A heat exchanger is provided through which a coolant flows in thermal contact with the fuel and a fan is operable to accelerate the flow of coolant fluid through the heat exchanger. The fan is driven by a hydraulic motor which is supplied with part at least of the fuel flow passing through the return line.

8 Claims, 2 Drawing Figures

MEANS FOR THE IN-FLIGHT COOLING OF THE FUEL CARRIED BY AN AIRCRAFT

The present invention relates to means for the in-flight cooling of the fuel carried by an aircraft which is equipped with a fuel feed pump for supplying fuel to the engine and a return line such that under certain engine operating conditions at least part of the fuel delivered by said feed pump can be recycled to the suction side of the pump.

The in-flight cooling means comprises a heat exchanger through which a coolant flows in thermal contact with the fuel to be cooled and means operable to accelerate the flow of coolant fluid through said heat exchanger.

In calculating the characteristics of a heat exchanger and in determining the parameters which govern its operation (dimension, shape, materials, nature and velocity of circulation of the fluids involved, pressure losses, etcetera,), account is generally taken of a certain number of criteria or conditions which must be met, such as the heat exchange efficiency, period of operation of the heat exchanger, weight and size of the exchanger, manufacturing and operating costs, etcetera. The final choice is therefore normally a compromise between these various conditions which are often in conflict. In the case of a heat exchanger designed for installation in an aircraft, two of the aforesaid criteria are particularly important, namely the size and the weight of the heat exchanger which must both be reduced to the greatest possible extent. The fluid utilised for cooling the fuel may be air or oil.

In the case of a pump whose delivery rate is dependent on the pump operating speed (a gear pump for example), the delivery rate required for operation of the engine is achieved by variation of the amount of fuel recycled as controlled by the engine fuel control system. One of the effects of recycling the fuel is to raise the temperature of the fuel. However, at high altitudes, such recycling is very important because the fuel flow rate to the injectors, which is necessary for the operation of the engine, has to be reduced. The result is a substantial increase in the fuel temperature which is added to the temperature rise brought about by the reduction in the specific mass of the air so that, for a given heat exchanger, the air cooling efficiency is much less at high altitudes than it is at low altitudes.

Thus, if it is required to retain an acceptable air cooling efficiency at all altitudes, it is necessary to design the heat exchanger for operation at high altitudes. Being thus designed to perform efficiently their function under the most unfavourable conditions, the fuel cooling systems contained on board an aircraft are generally of substantial size and weight which, as pointed out above, is undesirable because of payload and other considerations.

An object of the invention is to improve the efficiency of cooling of the fuel carried by the aircraft. The invention is particularly concerned with the case in which the cooling fluid is constituted by an atmospheric air flow, and has as an object the reduction at least in part of the drawbacks of size and weight hereinbefore referred to, by controlling the volumetric flow rate of the air cooling the fuel in order to compensate for variations in the specific gravity of the air with altitude. Another object is to increase the overall efficiency of the aircraft.

Cooling means of the aforesaid kind thus comprises a hydraulic motor for driving the flow-accelerating means, and means for supplying said hydraulic motor with part at least of the fuel flow passing through the return line.

As those skilled in the art will appreciate, this arrangement is particularly significant because it exploits, in an economical and advantageous manner, a certain parallelism (which was not self-evident) which becomes apparent when the altitude of the aircraft increases. This relationship occurs between the increase in the volumetric flow rate of the air required to flow through the exchanger in order to compensate for the reduction in specific gravity of the air with altitude and the increase in the flow rate of the recycled fuel due to the fact that the effective rate of consumption of fuel by the engine diminishes with altitude.

In other words, the energy requirements for driving the flow-accelerating means, which may be in the form of a fan or rotor, and the "free" energy available (in the form of high pressure fuel which is being recycled) to meet these requirements, will vary in the same sense. The aforesaid hydraulic motor is preferably a hydraulic turbine, for example a "Pelton" turbine.

The flow-accelerating means and the hydraulic turbine preferably comprise one and the same rotor equipped with two radially spaced arrays of blades, respectively traversed by the cooling fluid and by the fuel flowing from the return line. Means may be provided to regulate the fuel supplied to the hydraulic motor or turbine as a function of the temperature of the fuel being cooled.

The invention will now be described by way of example with reference to one embodiment of in-flight cooling means for the fuel of an aircraft which is illustrated in the accompanying drawings, in which.

Figure 1:
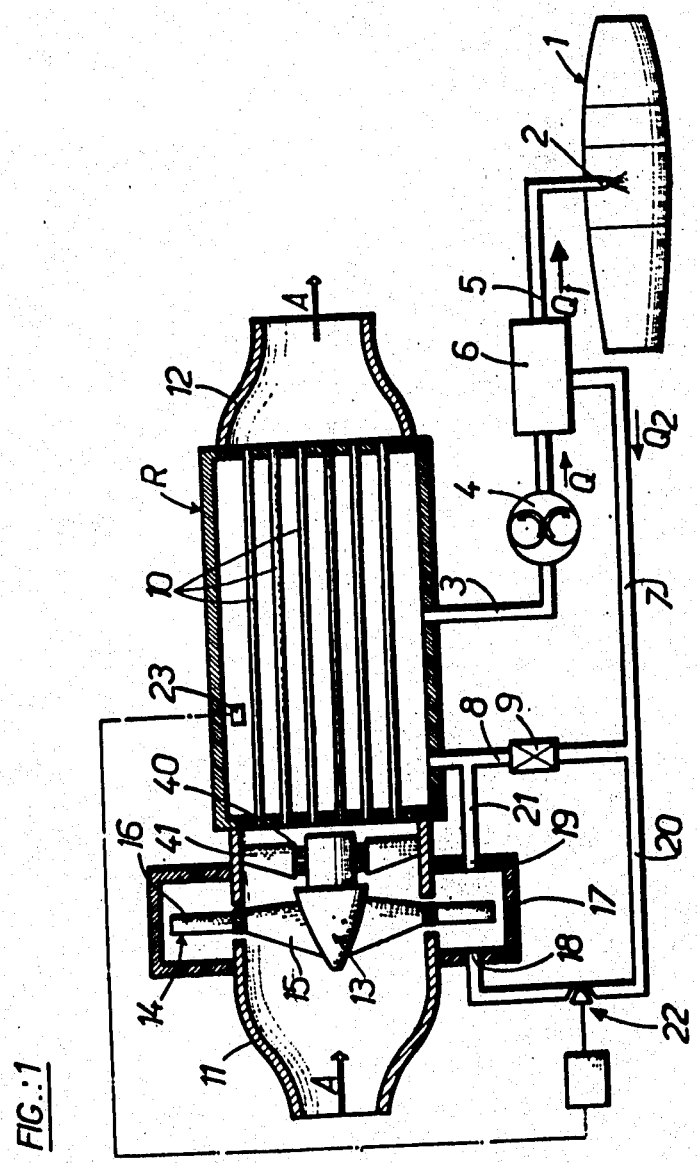
FIG. 1 is a schematic view of the cooling means.

In FIG. 1 the reference 1 signifies an engine such as a turbojet engine, installed in an aircraft (not shown) for propulsion purposes. The engine 1 comprises at least one burner 2 supplied with fuel from a fuel tank R installed in the aircraft. The tank R is connected to the burner 2 by means of a low-pressure line 3, a fuel pump 4 and a high-pressure line 5. The latter line contains a throttle and metering device 6 which, depending upon the fuel requirements, permit variation of the effective fuel flow rate $Q_1$ to the engine.

The pump 4 is of the fixed delivery kind so that, for a given speed of rotation of the pump, the rate of delivery of fuel is constant. Under certain engine operating conditions, at least a certain fraction $Q_2$ of the flow delivered by the pump 4, must therefore be recycled to the suction side of the pump.

Accordingly, said fraction $Q_2$ is supplied through a return line 7 communicating with the tank R by way of a line 8, which contains a spring-loaded valve 9 serving also as an energy-dissipating device. This valve is open as soon as the pressure in the return line 7 exceeds a given level and enables the recycled fuel fraction $Q_2$ to return, after its energy has been dissipated, to the reservoir R. In operation, the condition $Q = Q_1 + Q_2$ always holds. This means that if the effective rate of consumption $Q_1$ of the engine is reduced (and this is particularly the case as the aircraft altitude increases), the recycled flow rate $Q_2$ increases.

The temperature of the fuel contained in the tank R tends to rise during a flight, firstly because of the proximity of the heat source constituted by the engine 1 to the tank and the lines through which the fuel flows and secondly because of the dissipation of energy from the recycled fuel. For safety reasons, the fuel must therefore be cooled and the fuel is therefore placed in heat exchange relationship with a coolant fluid of appropriate kind, such as air.

FIG. 1 illustrates a heat exchanger 10 comprising a plurality of heat exchange tubes arranged to pass through the tank R. The outer surfaces of the tubes are in heat-transferring contact with the fuel which is to be cooled, and the inner surfaces thereof are in thermal contact with an airflow A. The airflow enters the heat exchanger through an intake fairing 11, and leaves through an exit fairing 12.

Means are provided to accelerate the flow of cooling fluid through the heat exchanger tubes 10. As shown in FIG. 1 the flow-accelerating means comprises, a fan or blower 13, preferably of the helical centrifugal kind, arranged in the intake fairing 11 and driven by a hydraulic motor 14 such as a "Pelton" hydraulic turbine. The blower 13 and the turbine 14 have a common rotor journalled in a bearing 40 carried by streamlined arms 41. The rotor has two radially superimposed rings of blades, namely a ring 15 of blower blades and a ring 16 of turbine blades.

The ring 16 of turbine blades rotates inside a casing 17 having an inlet 18 and an outlet 19. The inlet 18 of the turbine casing contains a tangential "Pelton" injector and is connected to the fuel return line 7 by a line 20. The outlet 19 of the casing 17 is connected to the tank R through a line 21. The fluid driving the hydraulic turbine 14 is thus constituted by part at least of the fuel flow $Q_2$ passing through the return line 7.

The blower 13 is operable to deliver a substantial airflow through the heat exchange tubes 10. The speed of rotation of the hydraulic turbine 14 (and, consequently, the airflow rate delivered by the blower 13) can be regulated by means of a restrictor 22, which thereby permits modification of the flow of high-pressure fuel arriving at the turbine. The restrictor 22 can be operated automatically in dependence on the temperature of the fuel in the tank R, this temperature being sensed by a detector 23.

Figure 2:
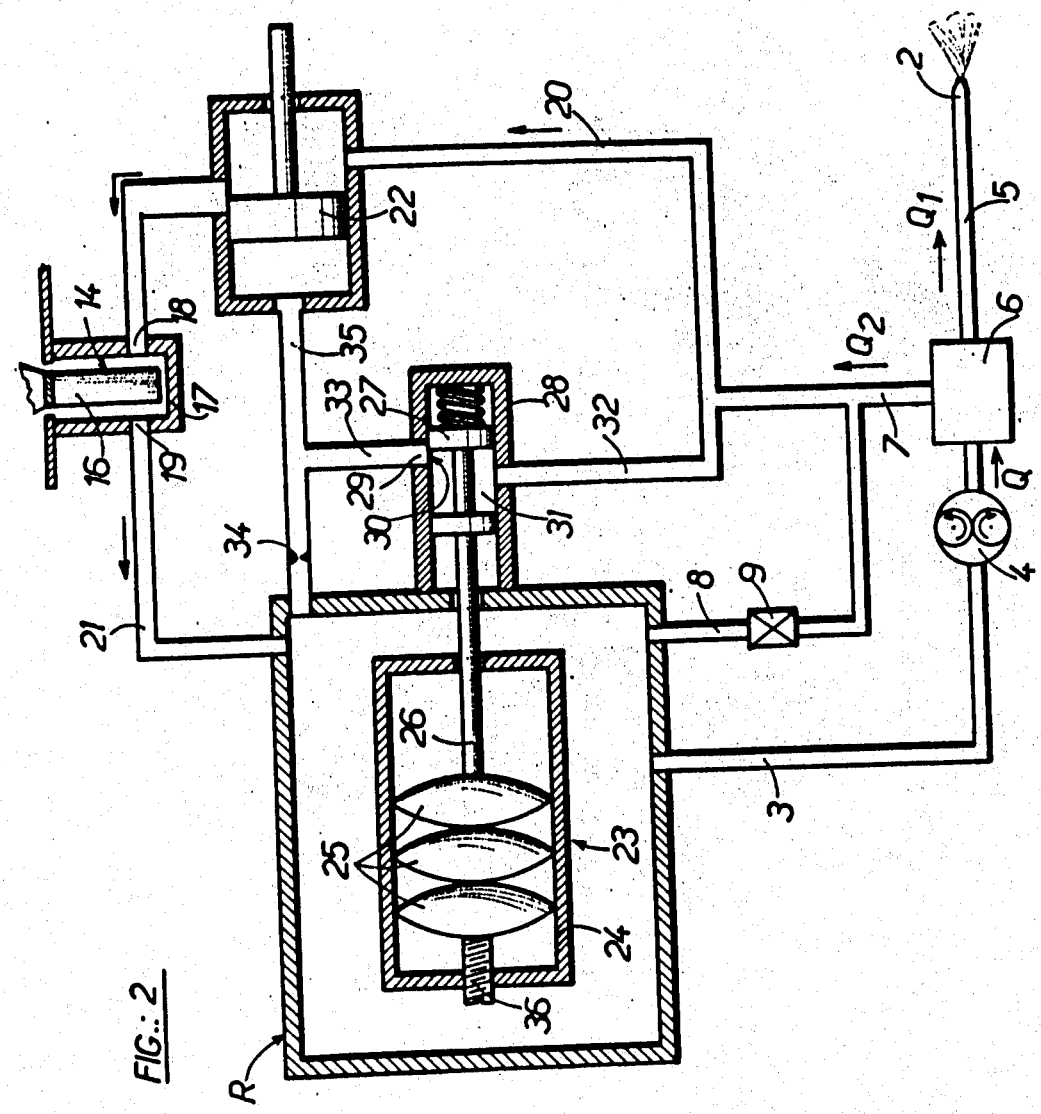
FIG. 2 is a schematic view of certain parts of said cooling means.

FIG. 2 illustrates an embodiment of the means for controlling operation of the restrictor 22. The detector 23 comprises a hermetically sealed housing 24 immersed in the fuel tank R. The housing contains a set of deformable capsules 25 immersed in an expansible fluid. These capsules are connected, by a rod 26, to a pivot valve 27 arranged for movement within a housing 28 and cooperating with a port 29 formed in said housing in order to define a passage 30 of variable cross-sectional area. In association with the housing 28, the pilot valve 27 defines a chamber 31 permanently connected to the return line 7 by a line 32. The chamber 31 likewise communicates, by the variable-section passage 30, a line 33 and a restriction 34, with the fuel tank R. The pressure prevailing in the line 33 upstream of the restriction 34 is tapped through a line 35 and applied to a servo-piston which constitutes the restrictor 22 referred to above.

As the temperature of the fuel in the tank R rises, the volume and pressure of the expansible fluid in the housing 24 increase, so that the capsules 25 are compressed. The rod 26 of the pilot valve 27 is thus displaced towards the left so that the cross-sectional area of the passage 30 is reduced. Consequently, the pressure prevailing in the line 35 is reduced and the restrictor 22 is displaced towards the left, i.e., in such a direction as to increase the rate of fuel delivery to the turbine 14. The latter accelerates so that the volume of cooling airflow delivered by the blower 13 to the heat exchanger 10 is increased and with it the efficiency of cooling of the fuel contained in the tank R.

A screw 36, bearing against the capsules 25, is provided for adjustment of the operating threshold of the control system. For example, it is possible to adjust the system so that, below a certain fuel temperature, the turbine 14 does not receive any drive fluid. The blower 13 then simply windmills under the action of the airflow A due to the dynamic pressure consequent upon the aircraft's motion.

The present invention enables various advantages to be secured. A first of these is constituted by the facility to regulate automatically, as requirements dictate, the efficiency of cooling of the fuel, even though one is using a heat exchanger 10 of reduced size and weight. A second advantage resides in the increase in the general efficiency of the cooling means by the use of the "free" energy contained in the recycled fuel flow passing back to the pump 4.

It should be pointed out that the exploitation of this "free" energy is all the more timely since it is achieved when the aircraft is flying at very high altitudes. In other words, a favourable combination is then obtained between the requirement for increasing the volumetric flow rate of the cooling air in order to compensate for the reduction in the specific gravity of the air with increasing altitudes, and a response to this requirement (namely the existence of a larger energy source, constituted by the recycled fuel flow). It should be borne in mind in this context that the effective rate of fuel consumption $Q_1$ of the engine 1 is reduced as the altitude increases so that the rate of fuel flow $Q_2$ available to operate the turbine 14 is increased and with it the volumetric flow rate of cooling air delivered by the blower 13 to the heat exchanger 10.

In a modified arrangement, the heat exchanger 10 is located outside the tank R, to which it is then connected through fuel flow lines. In addition, the hydraulic motor 14, instead of being located at the periphery of the blower 13, could be arranged at the blower hub.

I claim:

1. Means for the in-flight cooling of the fuel carried by an aircraft which is equipped with a fuel feed pump for supplying fuel to the engine and a return line so that under certain engine operating conditions at least part of the fuel delivered by said feed pump can be recycled to the suction side of the pump, said cooling means comprising a heat exchanger through which a coolant flows in thermal contact with the fuel to be cooled, means operable to accelerate the flow of coolant fluid through said heat exchanger, a hydraulic motor for driving said accelerating means and means for supplying said hydraulic motor with at least part of the fuel flow passing through the return line.

2. Cooling means according to claim 1, wherein said hydraulic motor is a hydraulic turbine.

3. Cooling means according to claim 2, wherein said hydraulic turbine is a "Pelton" turbine.

4. Cooling means according to claim 2, wherein said flow-accelerating means and said hydraulic turbine comprise one and the same rotor which has two radially spaced rings of blades respectively traversed by the cooling fluid and from the fluid flowing from the return line.

5. Cooling means according to claim 1, wherein means are provided for regulating the flow of fuel to said hydraulic motor.

6. Cooling means according to claim 5, wherein means are provided for detecting the temperature of the fuel and for controlling the fuel flow regulating means in dependence on said detected temperature.

7. Cooling means according to claim 1, wherein the cooling fluid is air and the flow-accelerating means comprises a blower.

8. Cooling means according to claim 6, wherein said temperature detecting means comprise a chamber containing an expansible fluid and deformable capsules connected to a pilot valve.

* * * * *